Inventor
W. E. White
By Arthur H. Sturges
Attorney

Patented Aug. 24, 1937

2,090,857

UNITED STATES PATENT OFFICE 2,090,857

TRAILER HITCH

Willard E. White, Rickreall, Oreg.

Application January 2, 1937, Serial No. 118,819

2 Claims. (Cl. 280—33.44)

This invention relates to motor vehicles and more particularly to a trailer hitch therefor.

It is an object of the present invention to provide means for reinforcing the bumper bars of said vehicles from the frames thereof for towing trailers, whereby stresses generated during trailer towing operations are removed from said bumper bars and transferred to and divided between the side frame rails of said vehicles.

Another object of the invention is to provide a trailer hitch of ornate appearance, the coupling portion of which may be selectively applied to or removed from a bumper bar expeditiously.

With the above and other objects in view, the invention consists in the novel features of the particular combination and arrangement of parts hereinafter more fully set forth, pointed out in the claims and shown in the accompanying drawing, wherein:

Figure 1:
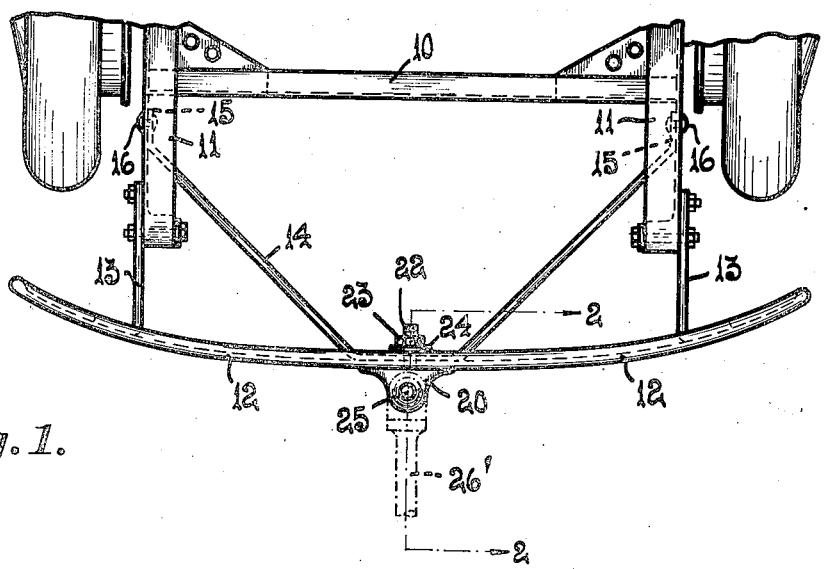
Figure 1 is a top plan view of a trailer hitch combination constructed in accordance with the present invention.

Referring now to the drawing for a more particular description, 10 indicates the rear transversely disposed frame member of a motor vehicle such as an automobile, said frame including oppositely disposed side rails 11, to which is attached a transversely disposed bumper bar 12, said bar being carried by the rails 11 on arms 13 which extend outwardly and rearwardly from said rails, and it will be understood that resultant from the modern stream-lining of automobiles, the rear ends of said modern vehicles project much further away, rearwardly, from the rear wheels and the frame rails 11 than heretofore, necessitating elongated side rails 11 or arms 13 for positioning the bumper bar 12 rearwardly of and as a protection for said stream-lined body, said bumper bar being of spring material and of insufficient rigidity or strength for towing a heavy trailer which is ditched directly to the bumper bar 12 without reinforcement for the latter.

A brace-bar 14 of substantially V-shape in plan is provided, having opposite ends 15 secured to opposite frame rails by any suitable means such as welding, the rivets 16 or the like. The apex of said V-brace extends to a point substantially mid-way between the ends of the bumper bar 12 and is provided with an aperture 17 as best shown in Figure 2.

An aperture 18 is provided through the bumper bar 12 and disposed in alignment with the aperture 17 of the brace bar.

Figures 2, 3:
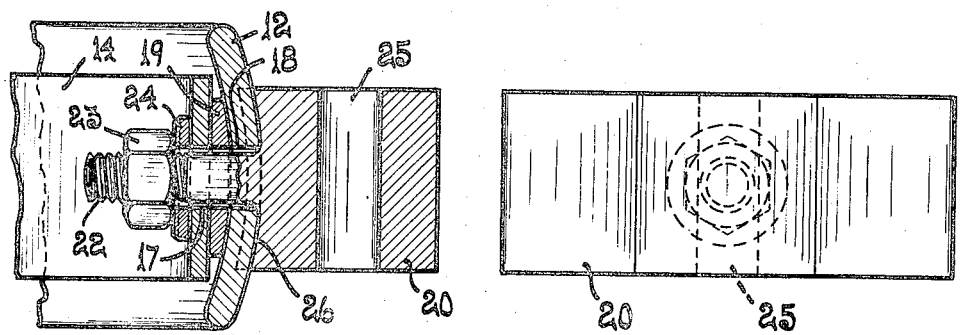
Figure 2 is a transverse section taken substantially on line 2—2 of Figure 1.
Figure 3 is an elevation of a coupling shoe employed.
Figure 4:
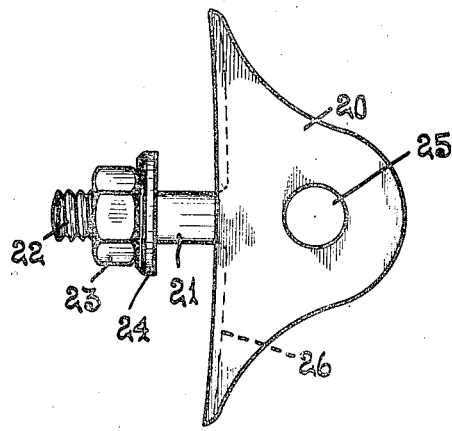
Figure 4 is a top plan view of said shoe.

The bumper bar 12 is usually of arcuate contour in cross section as shown in Figure 2 and a filler-washer 19 is preferably employed between the bumper bar and said brace bar in which case said filler washer is also provided with an aligned aperture.

A removable hitching shoe 20 having a shaft 21 is employed, which extends through said apertures and is provided with a threaded end 22.

The shaft 21 is adapted to receive a nut 23 having complemental threads with respect to the threads of the shaft, whereby upon rotation of the nut in a clockwise direction the brace bars 14 for the bar 12, together with the shoe 20 are rigidly locked together and a spring-lock washer 24 may be employed, if desired. As thus described it will be understood that the apex of the brace bar is prevented from moving laterally with respect to the bumper bar 12 and the latter is prevented at its medial portion from moving horizontally and rearwardly of the frame of the vehicle. The shoe 20 is provided with a vertically disposed aperture 25 for purposes later described. The surface of the shoe from which the shaft 21 thereof extends may be arcuate in contour as indicated at 26 for fitting snugly against the curved surface of the bumper bar, said shoe preferably being finished in the same color or style as said bumper bar.

The draw bar of a trailer is indicated by the dotted lines 26' in Figure 1. The free end of the draw bar 26 is provided with an aperture adapted to receive a pivot pin bolt, the latter also extending through the aperture 25 of the shoe 20 in use for coupling the trailer draw bar and trailer vehicle to the towing vehicle.

The trailer hitch may be applied to the vehicle at a factory during the manufacture of the latter and may also be conveniently applied to the vehicle by the owner thereof subsequent to manufacture of the vehicle and in operation the trailer is permitted to have pivotal turning movements while traversing curves of a roadway, while at the same time the stress of the towing operation is divided between and applied to the side rails 11 of the vehicle frame.

It is obvious that various changes and modifications may be made in the details of construction and design of the above specifically described embodiment of this invention without departing from the spirit thereof, said changes and modifications being restricted only by the scope of the invention as claimed.

What is claimed is:

1. A towing means for a trailer having, in combination a self-propelled vehicle provided with side frame rails, arms carried by said rails extending rearwardly therefrom, a bumper bar secured to said arms and having an aperture disposed substantially mid-way therebetween, reinforcements for said bumper bar comprising a V-shaped brace having ends secured to said side rails and extending to the medial portion of said bumper bar adjacent the aperture thereof, the apex of said brace having an aperture in alignment with the aperture of the bumper bar, means for locking said bumper bar and brace together comprising a shoe provided with a threaded shank extending through said apertures, and a detent nut threaded on said shank, said shoe having an aperture for receiving the coupling bolt of a trailer draw-bar for pivotally connecting the trailer to said vehicle, whereby towing stress is applied to and evenly divided between the side rails of said frame.

2. In a trailer hitch, side rails of a motor vehicle frame, a bumper bar carried by said rails rearwardly of the latter, a towing brace-bar of substantially V-shape in plan, the ends of said brace-bar being secured to the side rails, the apex of said brace extending to said bumper bar and provided with an aperture, said bumper bar having an aperture in alignment with the aperture of the brace-bar, a removable shoe having a threaded shaft extending through said apertures, a nut for said shaft provided with complemental threads for securing the shoe to said bumper bar, said nut adapted to be rotated for locking said brace-bar to said bumper-bar for reinforcing the latter, said shoe provided with an aperture adapted to receive the coupling bolt of a trailer draw-bar for pivotally connecting a trailer to said vehicle for towing said trailer.

WILLARD E. WHITE.